US012549898B2

(12) United States Patent
Chang et al.

(10) Patent No.: US 12,549,898 B2
(45) Date of Patent: Feb. 10, 2026

(54) MICROPHONE CAPABLE OF COUNTERACTING NOISE

(71) Applicant: Taiwan Carol Electronics Co., Ltd., Taichung (TW)

(72) Inventors: Ching-Lu Chang, Taichung (TW); Chao-Chih Chang, Taichung (TW)

(73) Assignee: TAIWAN CAROL ELECTRONICS CO., LTD., Taichung (TW)

( * ) Notice: Subject to any disclaimer, the term of this patent is extended or adjusted under 35 U.S.C. 154(b) by 156 days.

(21) Appl. No.: 18/612,589

(22) Filed: Mar. 21, 2024

(65) Prior Publication Data

US 2024/0334123 A1 Oct. 3, 2024

(30) Foreign Application Priority Data

Mar. 30, 2023 (TW) ................................ 112112354

(51) Int. Cl.

*H04R 3/00* (2006.01)
*G10K 11/178* (2006.01)
*H04R 1/04* (2006.01)
*H04R 1/28* (2006.01)
*H04R 9/08* (2006.01)

(52) U.S. Cl.

CPC ....... *H04R 3/005* (2013.01); *G10K 11/17873* (2018.01); *H04R 1/04* (2013.01); *H04R 1/2876* (2013.01); *H04R 9/08* (2013.01); *H04R 2410/05* (2013.01)

(58) Field of Classification Search

CPC . H04R 3/005; H04R 1/08; H04R 1/04; H04R 1/2876; H04R 9/08; H04R 2410/05; G10K 11/17873

See application file for complete search history.

(56) References Cited

U.S. PATENT DOCUMENTS

2016/0269830 A1* 9/2016 Chang ...................... H04R 9/08
2020/0366985 A1* 11/2020 Peng ........................ H04R 1/04

FOREIGN PATENT DOCUMENTS

CN 106034275 A * 10/2016

* cited by examiner

*Primary Examiner* — Yogeshkumar Patel

(57) ABSTRACT

A microphone includes a housing unit, a capsule unit mounted on the housing unit, a noise-counteracting unit electrically connected to the capsule unit with opposite electrical polarity, and a damping unit connected to the housing unit. The capsule unit generates a primary electrical signal composed of a primary signal part attributed to an acoustic wave and a secondary signal part attributed to a first mechanical wave which is generated due to vibration of the housing. The noise-counteracting unit generates a secondary electrical signal attributed to the first mechanical wave and having an electrical polarity opposite to that of the primary electrical signal, so that the secondary electrical signal may counteract the secondary signal part of primary electrical signal. The damping unit generates a second mechanical wave to counteract the first mechanical wave when the first and second mechanical waves are transmitted to the capsule unit.

8 Claims, 12 Drawing Sheets

MICROPHONE CAPABLE OF COUNTERACTING NOISE

CROSS-REFERENCE TO RELATED APPLICATION

This application is a secondary filing of Taiwan Patent Application No. 112112354 filed with the Taiwan Intellectual Property Office on Mar. 30, 2023, which is incorporated herein by reference in its entirety.

FIELD

The disclosure relates to a microphone, and more particularly to a microphone capable of counteracting noise.

BACKGROUND

Taiwanese Invention Patent No. I548285 and Taiwanese Invention Patent No. I706678 each discloses a conventional microphone. Referring to FIG. 1, the conventional microphones disclosed by Taiwanese Invention Patent No. I548285 and Taiwanese Invention Patent No. I706678 have different noise suppression effects in different frequency ranges, respectively.

SUMMARY

Therefore, an object of the disclosure is to provide a microphone capable of counteracting noise that can alleviate at least one of the drawbacks of the prior art.

According to the disclosure, the microphone includes a housing unit, a capsule unit, a noise-counteracting unit, a damping unit, and a processing unit.

The housing unit includes a housing surrounding an axis, and a carrier disposed in the housing and surrounding the axis. The carrier has an outer surface and an inner surface that surround the axis, and is formed with at least one through hole that extends from the outer surface to the inner surface.

The capsule unit is mounted on the carrier, and is configured to generate a primary electrical signal composed of a primary signal part attributed to an acoustic wave and a secondary signal part attributed to a first mechanical wave which is generated due to vibration of the housing.

The noise-counteracting unit is mounted on the carrier, and is electrically connected to the capsule unit with opposite electrical polarity. The noise-counteracting unit is spaced apart from the capsule unit along the axis, and cooperates with the capsule unit and the carrier to define a first chamber in spatial communication with the at least one through hole. The noise-counteracting unit is configured to generate a secondary electrical signal attributed to the first mechanical wave and having an electrical polarity opposite to an electrical polarity of the primary electrical signal.

The damping unit includes a shock-absorbing component and at least one damping component. The shock-absorbing component is connected to the housing and the carrier, and cooperates with the housing, the carrier, and the noise-counteracting unit to define a second chamber that is configured to generate a second mechanical wave attributed to vibration of air in the second chamber. The second mechanical wave propagates through the at least one through hole and the first chamber to the capsule unit. The housing, the carrier, the capsule unit, the noise counteracting unit and the shock-absorbing component cooperatively define an airtight space. The damping component is disposed on the carrier to cover the at least one through hole, and is configured to change one of an amplitude and a phase of the second mechanical wave passing therethrough so as to make the second mechanical wave counteract the first mechanical wave when the second mechanical wave and the first mechanical wave are transmitted to the capsule unit.

The processing unit is disposed in the housing, is electrically connected to the capsule unit and the noise-counteracting unit, and is configured to receive the primary electrical signal and the secondary electrical signal and to make the secondary electrical signal counteract the secondary signal part of the primary electrical signal.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
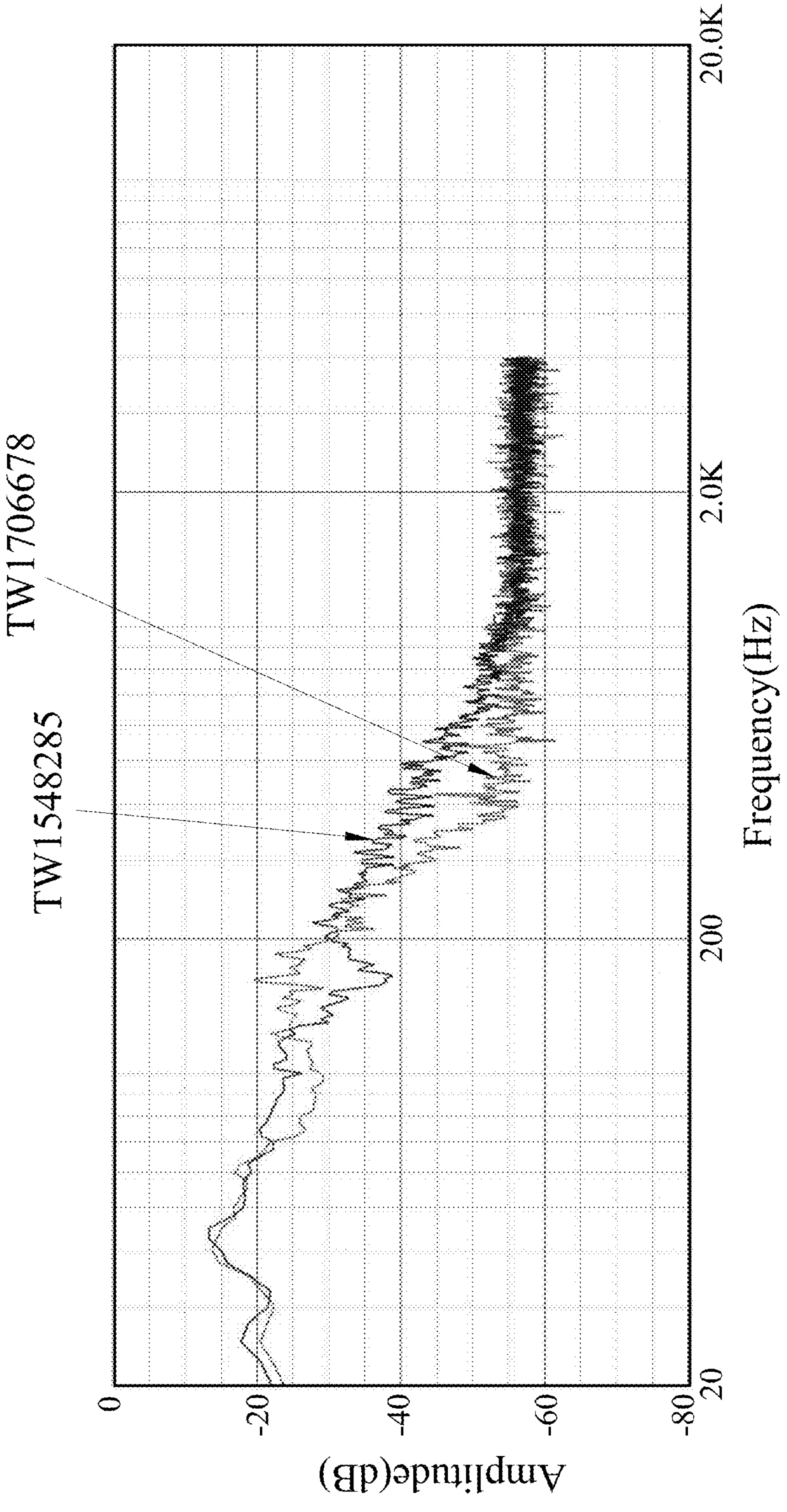
FIG. 1 PRIOR ART
FIG. 1 is a frequency response curve illustrating noise suppression effects respectively of conventional microphones provided by Taiwanese Invention Patent No. I548285 and Taiwanese Invention Patent No. I706678.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
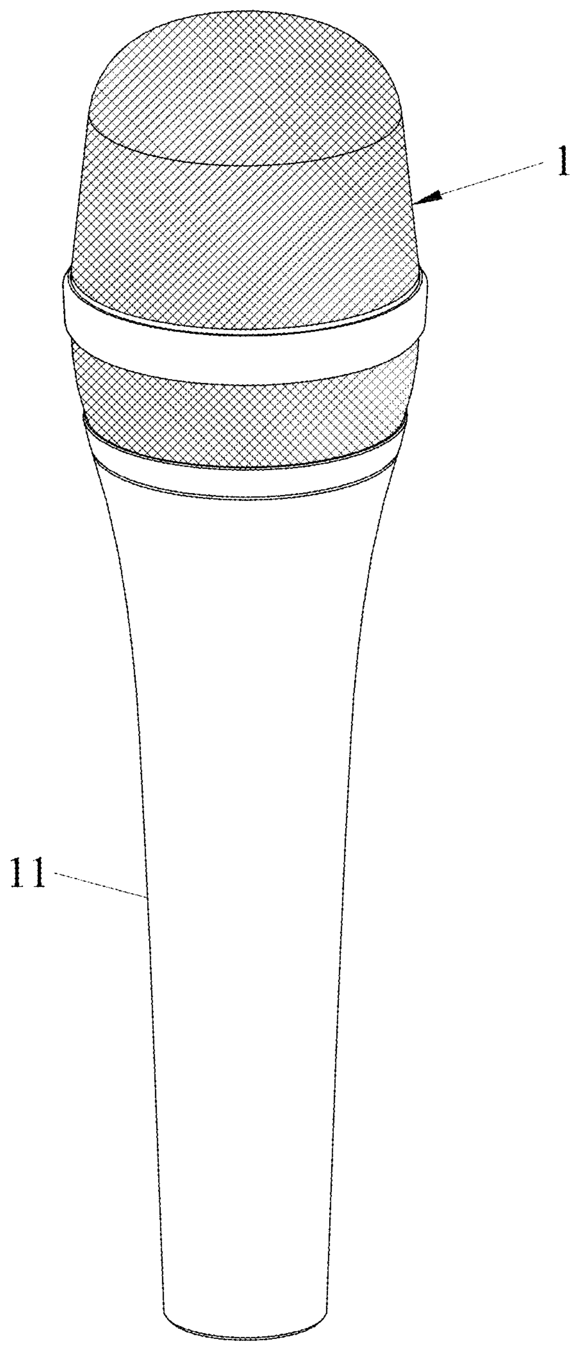
FIG. 2 is a perspective diagram of a microphone according to an embodiment of the present disclosure.
Figure 3:
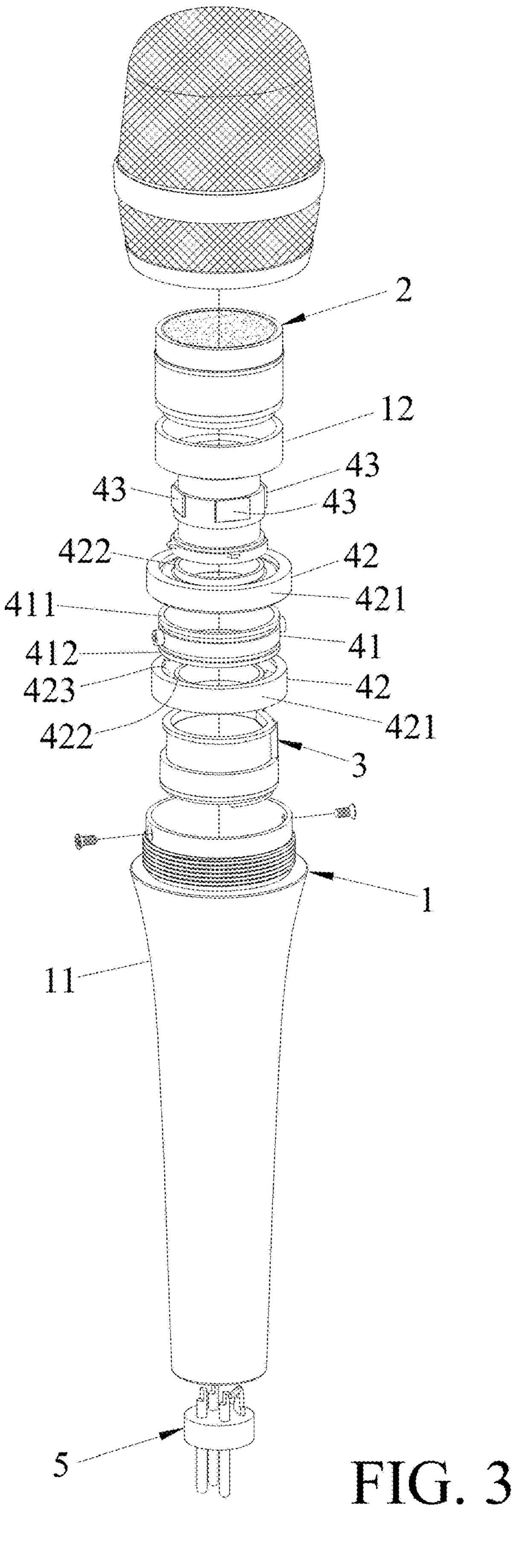
FIG. 3 is an exploded perspective view of the microphone according to an embodiment of the present disclosure.
Figure 4:
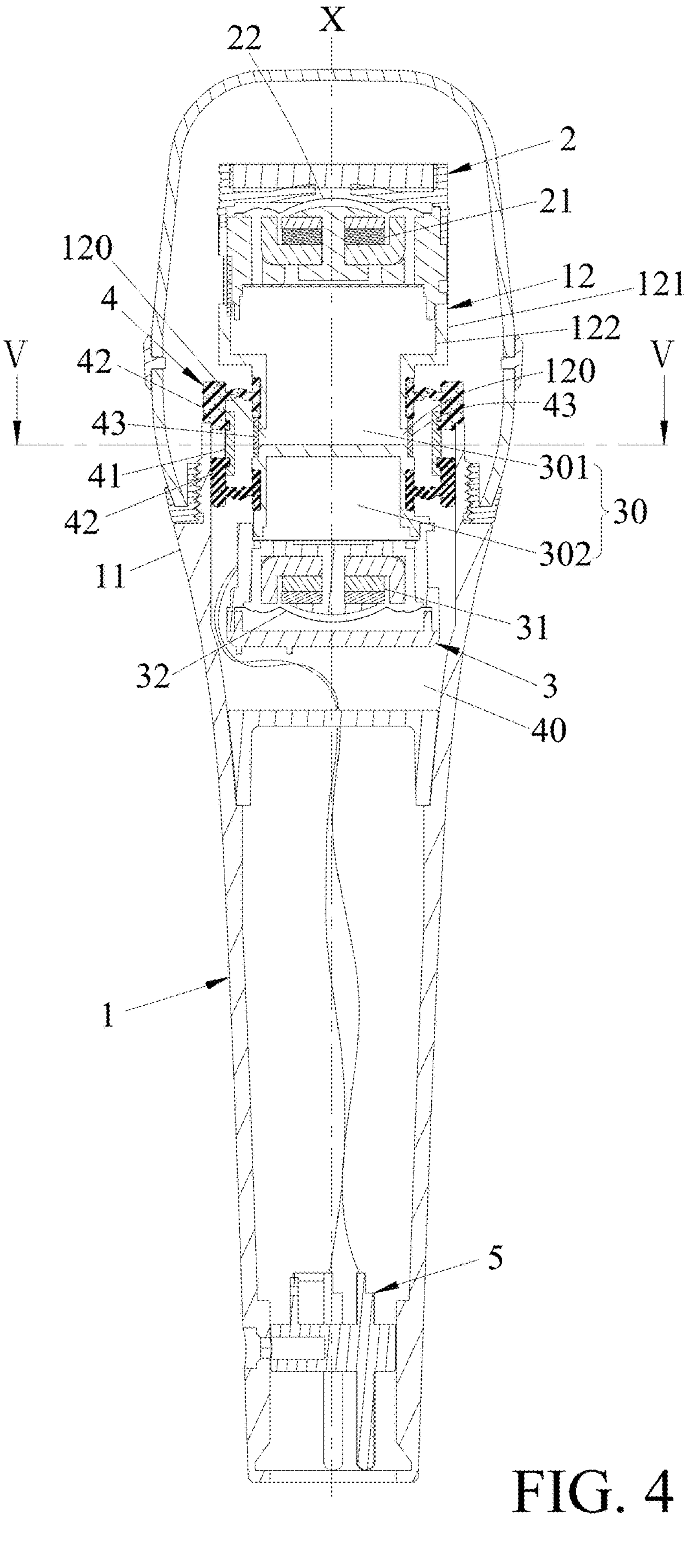
FIG. 4 is a cross-sectional view of the microphone according to a first embodiment of the present disclosure.

Referring to FIGS. 2, 3, and 4, a microphone capable of counteracting noise according to a first embodiment of this disclosure includes a housing unit 1, a capsule unit 2, a noise-counteracting unit 3, a damping unit 4, and a processing unit 5.

The housing unit 1 includes a housing 11 surrounding an axis (X), and a carrier 12 disposed in the housing 11 and surrounding the axis (X). The carrier 12 has an outer surface 121 and an inner surface 122 that surround the axis (X). The carrier 12 has at least one through hole 120 that extends from the outer surface 121 to the inner surface 122 and that has a total area ranging from 0.79 $mm^2$ to 227 $mm^2$.

Figure 5:
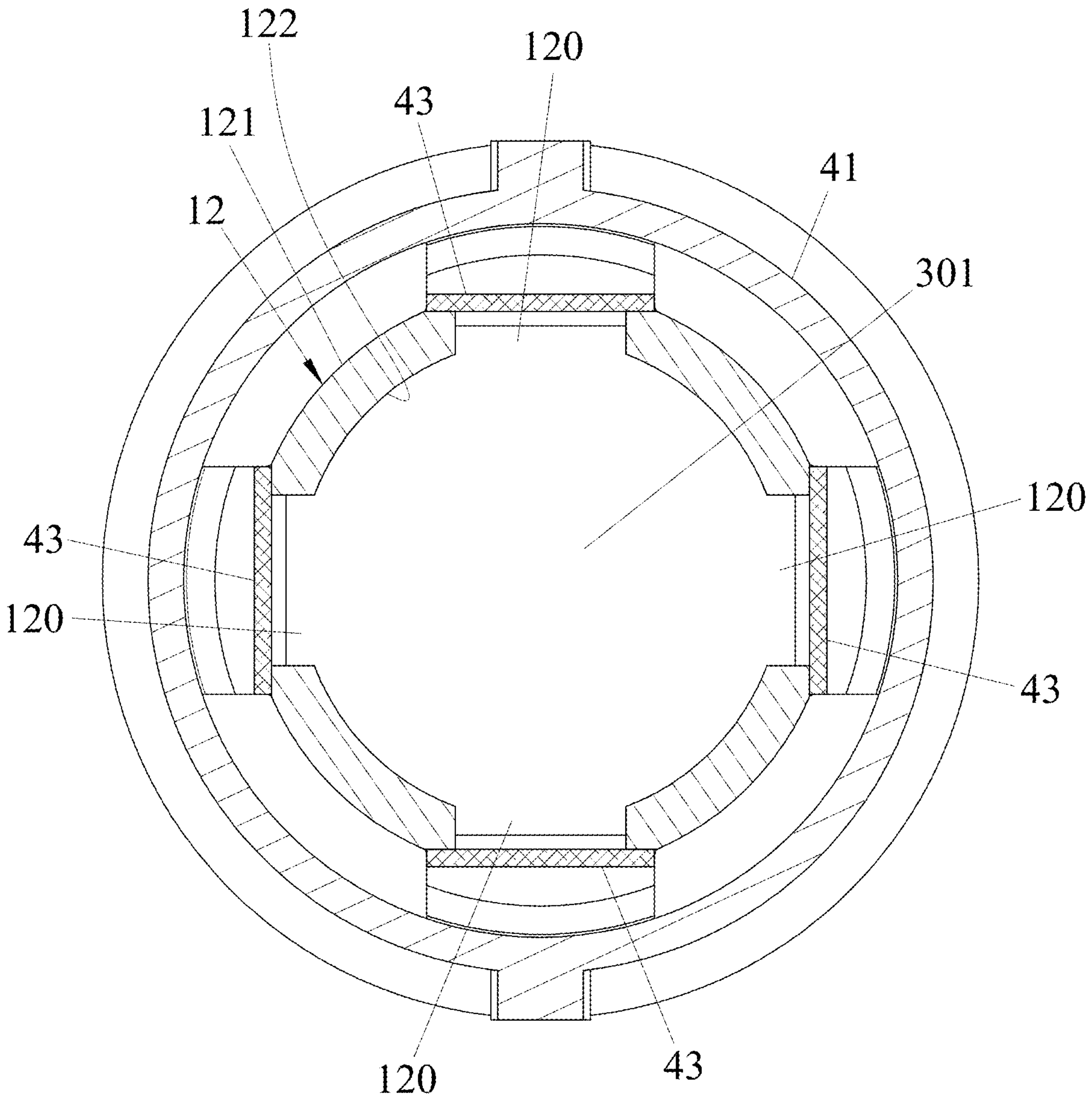
FIG. 5 is a cross-sectional view taken along line V-V in FIG. 4, illustrating a carrier of a housing unit of the microphone according to the first embodiment of the present disclosure.
Figure 6:
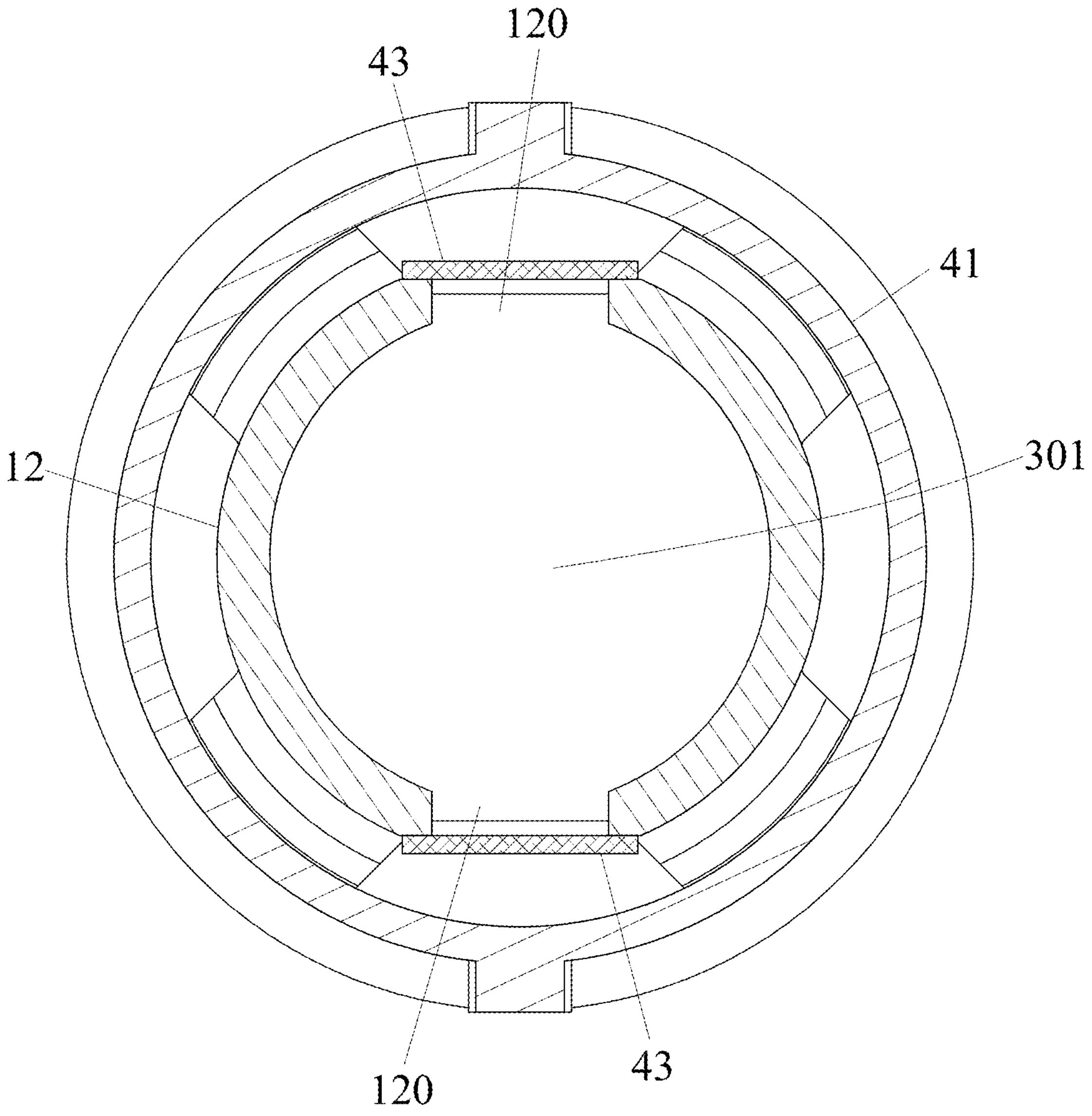
FIG. 6 is a cross-sectional view similar to FIG. 5, but illustrating a variation of the carrier according to an embodiment of the present disclosure.

Referring to FIGS. 4 and 5, in this embodiment, the carrier 12 has four through holes 120 each extending from the outer surface 121 to the inner surface 122. The four through holes 120 are distributed in an equiangular manner surrounding the axis (X). Each of the through holes 120 has a hole diameter ranging from 1 mm to 17 mm. In other embodiments, a number of the through holes 120 may be two (as shown in FIG. 6) or more.

Referring to FIGS. 3, 4, 7, and 9, the capsule unit 2 is mounted on one end of the carrier 12 along the axis (X) (i.e., an upper end shown in FIGS. 4 and 9), and is configured to generate a primary electrical signal (e.g., a voltage signal) composed of a primary signal part (V0) attributed to an acoustic wave (W1) and a secondary signal part (V1) attributed to a first mechanical wave (W2) which is generated due to vibration of the housing 11. The capsule unit 2 includes a first transducer 21, and a first diaphragm 22 that covers the first transducer 21. The first diaphragm 22 is configured to detect the acoustic wave (W1) and the first mechanical wave (W2), and to convert the acoustic wave (W1) and the first mechanical wave (W2) into a first vibration. The first transducer 21 is connected to the first diaphragm 22 and is configured to convert the first vibration into the primary electrical signal.

The noise-counteracting unit 3 is mounted on another end of the carrier 12 opposite to the capsule unit 2 (i.e., a lower end shown in FIGS. 4 and 9), and is electrically connected to the capsule unit 2 with an opposite electrical polarity. The noise-counteracting unit 3 is spaced apart from the capsule unit 2 along the axis (X), and cooperates with the capsule unit 2 and the carrier 12 to define a first chamber 30 in spatial communication with the through holes 120. The noise-counteracting unit 3 is configured to generate a secondary electrical signal (V2) (e.g., a voltage signal) attributed to the first mechanical wave (W2) and having an electrical polarity opposite to an electrical polarity of the primary electrical signal. The noise-counteracting unit 3 includes a second transducer 31, and a second diaphragm 32 that covers the second transducer 31. The second diaphragm 32 is configured to detect the first mechanical wave (W2), and to convert the first mechanical wave (W2) into a second vibration. The second transducer 31 is connected to the second diaphragm 32 and is configured to convert the second vibration into the secondary electrical signal (V2).

In this embodiment, the first transducer 21 has a positive terminal, and the second transducer 31 has a positive terminal electrically connected to the positive terminal of the first transducer 21. Accordingly, the secondary signal part (V1) and the secondary electrical signal (V2) that initially have similar amplitudes and waveforms may have a phase difference of 180 degrees.

The first chamber 30 is divided into two rooms (i.e., a first room 301 and a second room 302). The first room 301 is adjacent to the capsule unit 2 and is in spatial communication with the through holes 120. The second room 302 is adjacent to the noise-counteracting unit 3 and is airtight, so that the second room 302 may isolate the second mechanical wave (W3) from affecting the noise-counteracting unit 3. Each of the first room 301 and the second room 302 has a volume smaller than 12 $cm^3$. In this embodiment, the volume of the first room 301 is 6.44 $cm^3$, and the volume of the second room 302 is 2.45 $cm^3$.

The damping unit 4 includes a rigid ring 41, two shock-absorbing components 42, and four damping components 43.

The rigid ring 41 is connected to the housing 11, and has a first ring portion 411 and a second ring portion 412 that are opposite to each other along the axis (X). Specifically, the first ring portion 411 is closer to the capsule unit 2 than the second ring portion 412; that is to say, the first ring portion 411 is above the second ring portion 412 in an up-down direction shown in FIG. 4. In this embodiment, the rigid ring 41 is screwed to the housing 11.

The shock-absorbing components 42 are connected between the housing 11 and the carrier 12 to suspend the carrier 12 in the housing 11, and are spaced apart from each other along the axis (X). Each of the shock-absorbing components 42 includes a connection portion 421 that is connected to the rigid ring 41, and a suspending portion 422 that is opposite to the connection portion 421 in a direction perpendicular to the axis (X) and that fits over the carrier 12. Specifically, the connection portion 421 of one of the shock-absorbing components 42 (hereinafter referred to as "upper shock-absorbing component 42") fits over the first ring portion 411, and the connection portion 421 of another one of the shock-absorbing components 42 (hereinafter referred to as "lower shock-absorbing component 42") fits over the second ring portion 412. The upper shock-absorbing component 42 cooperates with the housing 11, the carrier 12 and the noise-counteracting unit 3 to define a second chamber 40. The second chamber 40 is in spatial communication with the first room 301 of the first chamber 30 through the through holes 120. The second chamber 40 is configured to generate a second mechanical wave (W3) attributed to vibration of air in the second chamber 40, and the second mechanical wave (W3) propagates through the through holes 120 and the first room 301 of the first chamber 30 to the capsule unit 2 (see FIG. 9). The housing 11, the carrier 12, the capsule unit 2, the noise-counteracting unit 3 and the shock-absorbing components 42 cooperatively define an airtight space (i.e., a combination of the second chamber 40 and the first room 301), such that the second mechanical wave (W3) attributed to vibration of air in the second chamber 40 will not propagate outside the second chamber 40 and the first room 301. The lower shock-absorbing component 42 is formed with a plurality of perforations 423 that extend along the axis (X) and that are in spatial communication with the second chamber 40 so as to allow the second mechanical wave (W3) to travel therethrough.

In this embodiment, the damping components 43 are disposed on the carrier 12 to cover the through holes 120, respectively. Each of the damping components 43 is adhered to the carrier 12, and may be made of breathable paper, breathable fabric, felt, or nylon.

Figure 8:
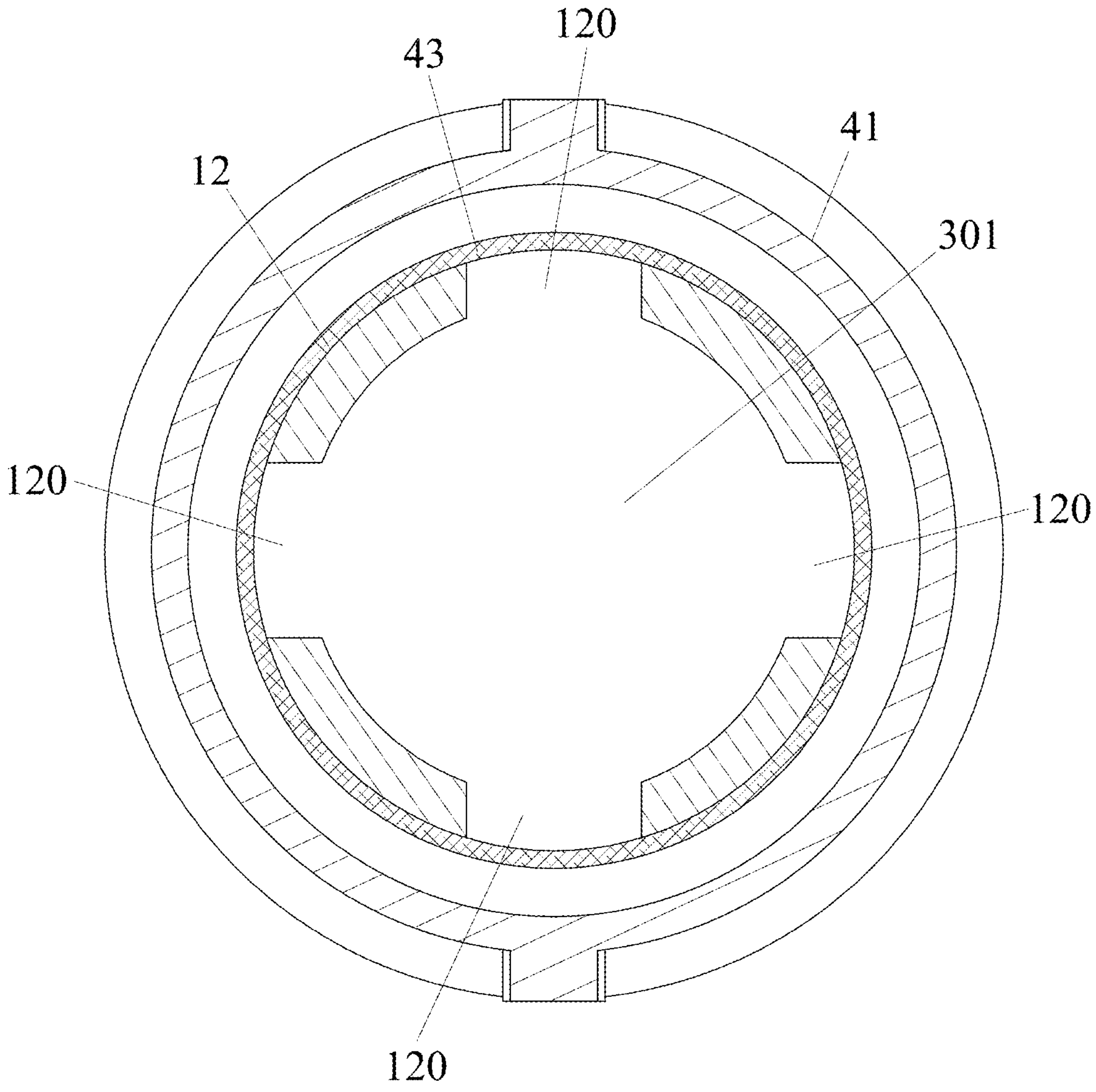
FIG. 8 is a cross-sectional view similar to FIG. 5, but illustrating another variation of the carrier according to another embodiment of the present disclosure.

In other embodiments as shown in FIG. 8, the damping unit 4 may include only one damping component 43 that is connected to and surrounds the carrier 12 to cover all of the through holes 120.

The processing unit 5 is disposed in the housing 11, and is electrically connected to the capsule module 2 and the noise-counteracting unit 3. The processing unit 5 is used to receive the primary electrical signal (the primary signal part (V0), the secondary signal part (V1)) and the secondary electrical signal (V2).

Due to the mechanical characteristics of the microphone of this disclosure, when a user rubs against the housing 11 while holding the microphone, when the user shakes the housing 11, thereby causing internal wires and/or circuits to collide with each other, or when there is a vibration coming from the external environment (e.g., the stage), the first mechanical wave (W2) is generated.

Figure 7:
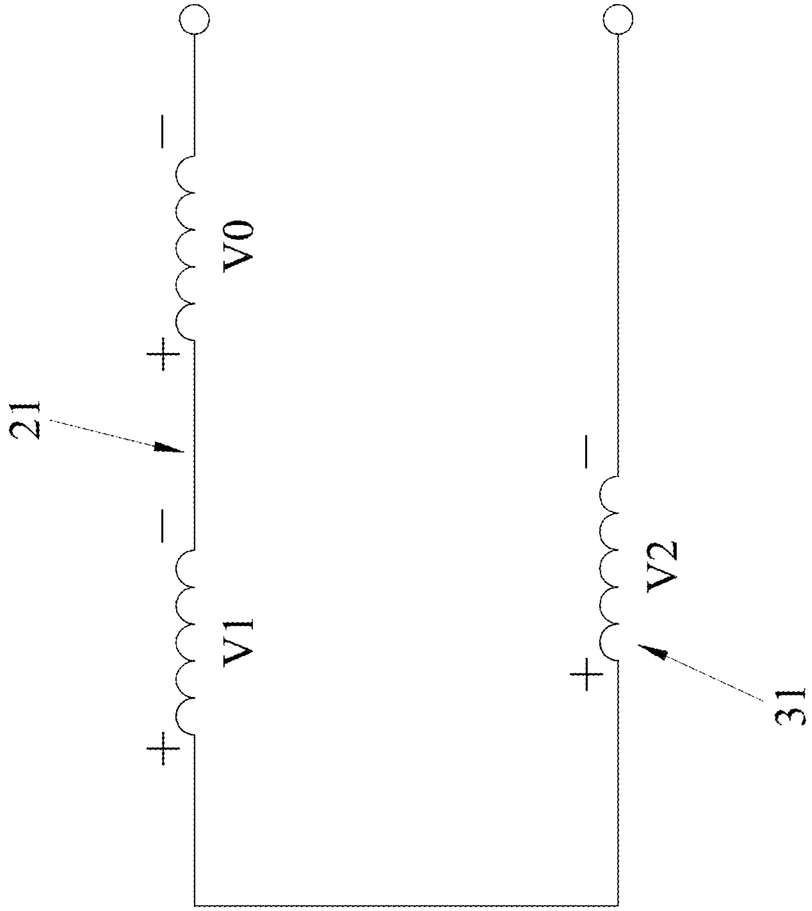
FIG. 7 is an equivalent-circuit diagram illustrating a first transducer of a capsule unit electrically connected to a second transducer of noise-counteracting unit with opposite electrical polarity according to an embodiment of the present disclosure.
Figure 9:
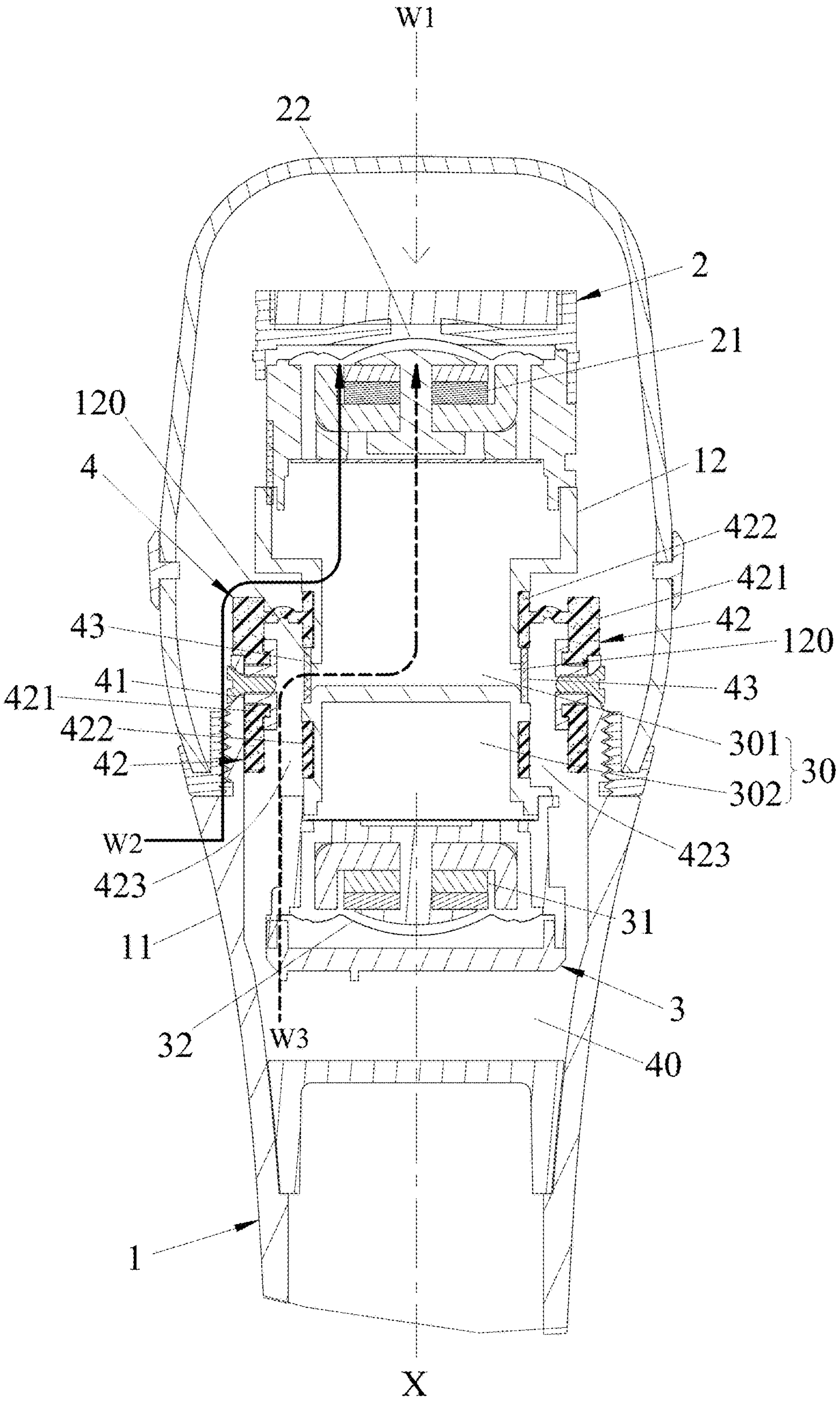
FIG. 9 is an enlarged fragmentary cross-sectional view of the microphone shown in FIG. 4.

Referring to FIGS. 7, and 9, when the acoustic wave (W1), which is transmitted through air as a transmission medium, and the first mechanical wave (W2), which is transmitted through the housing 11 and the carrier 12 as a transmission medium, are both transmitted to the capsule unit 2, the first diaphragm 22 of the capsule unit 2 generates the first vibration due to action of the acoustic wave (W1) and the first mechanical wave (W2) thereon. The first transducer 21 then converts the first vibration of the first diaphragm 22 into the primary electrical signal composed of the primary signal part (V0) attributed to the acoustic wave (W1) and the secondary signal part (V1) attributed to the first mechanical wave (W2).

At this time, since the noise-counteracting unit 3 is surrounded by the second room 302 of the first chamber 30 and the second chamber 40, which are both airtight, the acoustic wave (W1) is not easily transmitted to the second diaphragm 32. However, the second diaphragm 32 still generates the second vibration due to action of the first mechanical wave (W2) which is transmitted through the housing 11. The second transducer 31 then converts the second vibration of the second diaphragm 32 into the secondary electrical signal (V2).

Moreover, the vibration of air in the airtight second chamber 40 generates the second mechanical wave (W3). The second mechanical wave (W3) is transmitted using the air as a transmission medium, and passes through the perforations 423, the damping components 43, and the through holes 120 to the first room 301 of the first chamber 30. Eventually, the dampened second mechanical wave (W3), which has passed through the damping components 43, travels across the first room 301 to the first diaphragm 22.

The first mechanical wave (W2) and the second mechanical wave (W3) are caused by mechanical vibrations. Since both the secondary signal part (V1) of the primary electrical signal and the secondary electrical signal (V2) are caused by the first mechanical wave (W2), an amplitude (e.g., a voltage value) of the secondary signal part (V1) and an amplitude (e.g., a voltage value) of the secondary electrical signal (V2) are substantially the same. It should be noted that an amplitude and a phase of the second mechanical wave (W3) would change when the second mechanical wave (W3) passes through the damping components 43 due to acoustic impedance of the damping components 43. Hence, when the primary electrical signal (including the primary signal (V0) and the secondary signal part (V1)) and the secondary electrical signal (V2) are transmitted to the processing unit 5, the secondary signal part (V1) of the primary electrical signal and the secondary electrical signal (V2), which have similar voltage values but opposite electrical polarity, will counteract each other. Furthermore, the first mechanical wave (W2), and the dampened second mechanical wave (W3) which has passed through the damping components 43, have similar amplitudes but different phases, and will also counteract each other when being transmitted to the capsule unit 2. As a result, the processing unit 5 will only output the primary signal part (V0), which is attributed to the acoustic wave (W1), to an external speaker (not shown) or to an external electronic assembly unit (not shown) connected to the microphone.

Figure 10:
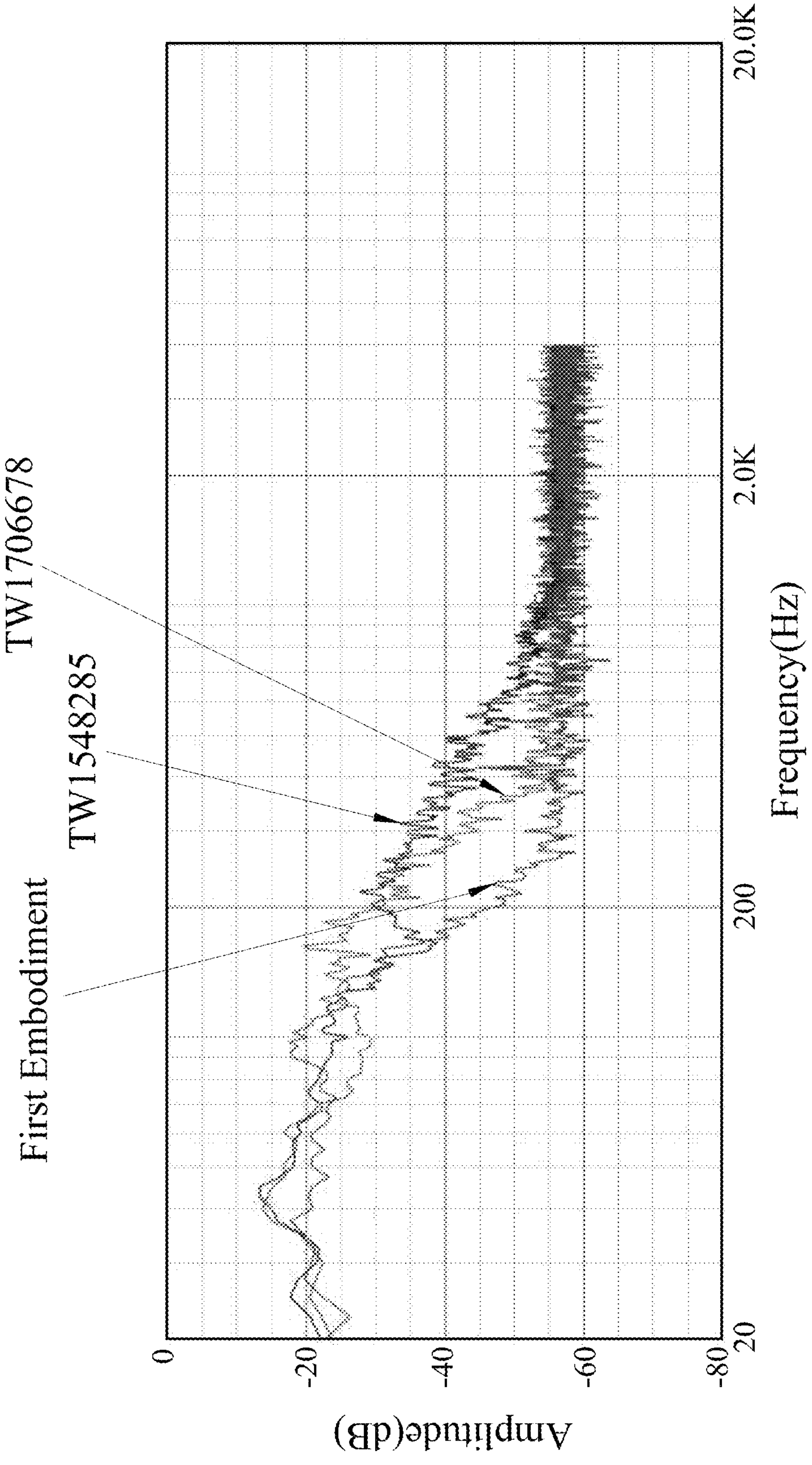
FIG. 10 is a frequency response curve illustrating the noise suppression effects respectively of the microphone according to the first embodiment and the conventional microphones provided by Taiwanese Invention Patent No. I548285 and Taiwanese Invention Patent No. I706678.

Referring to FIG. 10, the microphone of this disclosure offers greater noise suppression effect than the conventional microphones of Taiwanese Invention Patent No. I548285 and Taiwanese Invention Patent No. I706678.

Figure 11:
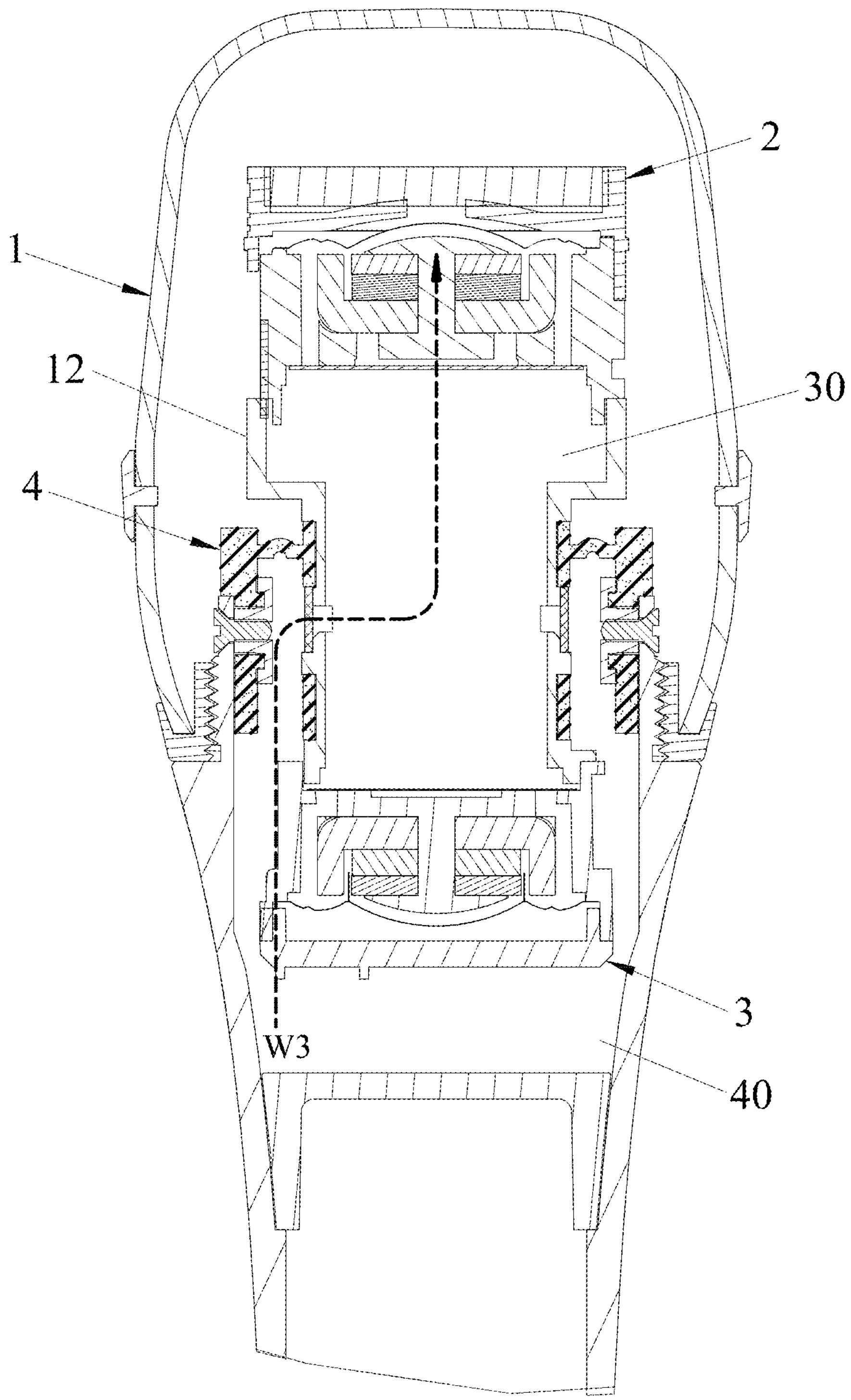
FIG. 11 is an enlarged fragmentary cross-sectional view of a microphone according to a second embodiment of the present disclosure.

Referring to FIG. 11, a microphone capable of counteracting noise according to a second embodiment of this disclosure is provided. In this embodiment, the first chamber 30 has only a single room and is not divided into two rooms, and the capsule unit 2 and the noise-counteracting unit 3 are spaced apart from each other by the first chamber 30. In this embodiment, the carrier 12 is configured to make a distance between the capsule unit 2 and the noise-counteracting unit 3 along the axis (X) far enough to reduce or ignore the effect of the second mechanical wave (W3) on the noise-counteracting unit 3.

Figure 12:
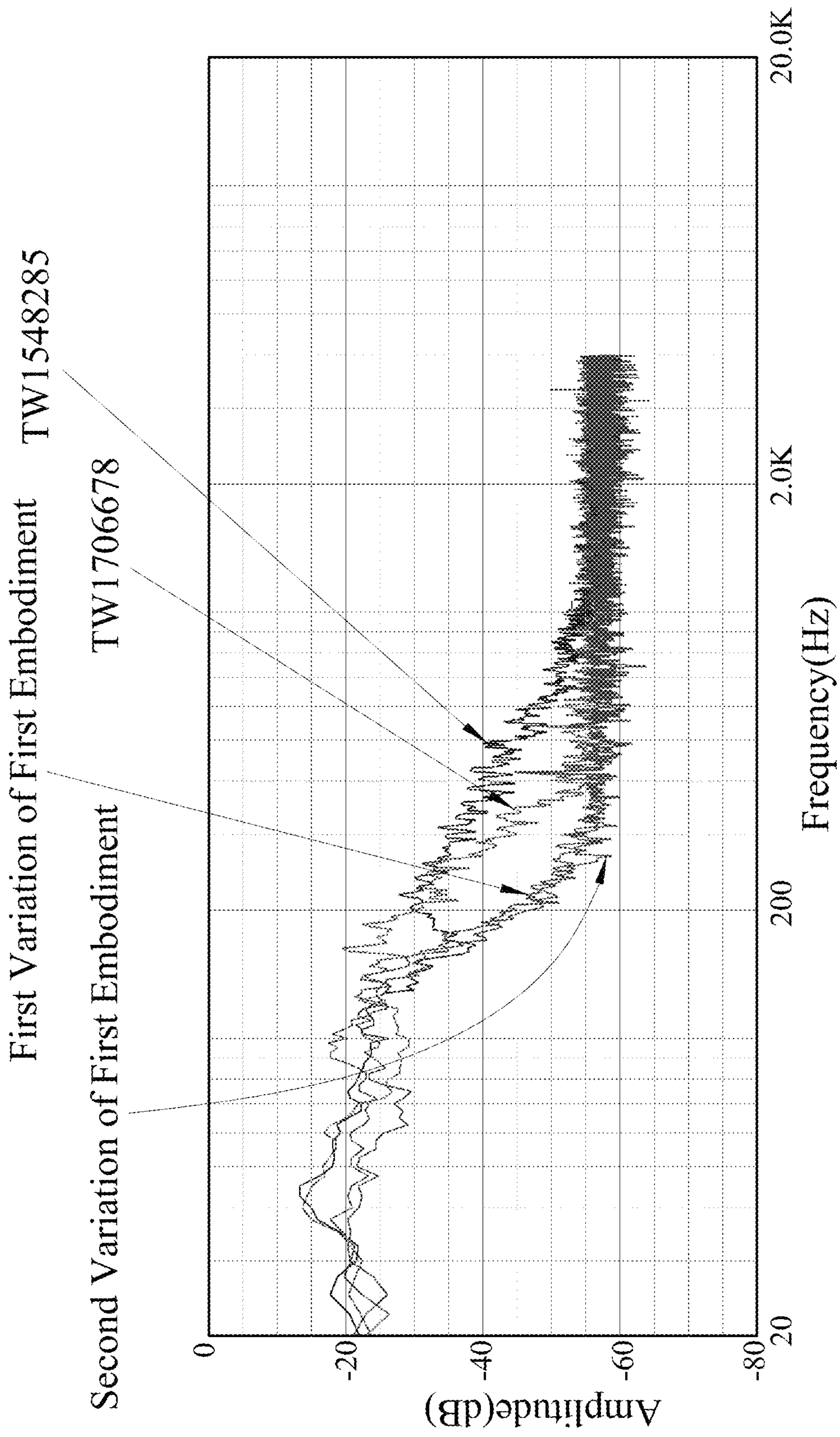
FIG. 12 is a frequency response curve illustrating the noise suppression effects respectively of the microphones according to different variations of the first embodiment, and the conventional microphones provided by Taiwanese Invention Patent No. I548285 and Taiwanese Invention Patent No. I706678.

Referring to FIG. 12, a first variation of the microphone according to the first embodiment has four of the through holes 120 with a total area of 48 $mm^2$, and a second variation of the microphone according to the first embodiment has two of the through holes 120 with a total area of 24 $mm^2$. Comparing the noise suppression effects of the microphones of the first and second variations with the conventional microphones provided by Taiwanese Invention Patent No. I548285 and Taiwanese Invention Patent No. I706678, it can be seen from FIG. 12 that the microphones of this disclosure offer greater noise suppression effect than the conventional microphones of Taiwanese Invention Patent No. I548285 and Taiwanese Invention Patent No. I706678.

To sum up, the microphone of this disclosure may generate the second mechanical wave (W3) by virtue of the second chamber 40 to counteract the first mechanical wave (W2), and may generate the secondary electrical signal (V2) by virtue of the noise-counteracting unit 3 to counteract the secondary signal part (V1) of the primary electrical signal, thereby resulting in a twofold effect of alleviating the undesired effect of the first mechanical wave (W2) on the output of the microphone (i.e., the primary signal part (V0) attributed to the acoustic wave (W1)) through mechanical and non-mechanical approaches. The microphone of this disclosure is not only capable of alleviating the effect of the vibration of the housing 11 on the output, but also capable of damping the first mechanical wave (W2) in a wide frequency range, hence achieving the objective of noise suppression and improving the sound quality.

Furthermore, by virtue of the shock-absorbing components 42, the carrier 12 may be suspended in the housing 11, and the second chamber 40 is created to be airtight. Moreover, the overall volume of the microphone is reduced, and it is relatively easier to install or replace the shock-absorbing components 42 since the shock-absorbing components 42 are disposed to fit over the rigid ring 41.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A microphone capable of counteracting noise, comprising:

a housing unit that includes a housing surrounding an axis, and a carrier disposed in said housing, surrounding the axis, having an outer surface and an inner surface that surround the axis, and formed with at least one through hole that extends from said outer surface to said inner surface;

a capsule unit that is mounted on said carrier, and that is configured to generate a primary electrical signal composed of a primary signal part attributed to an acoustic wave and a secondary signal part attributed to a first mechanical wave which is generated due to vibration of said housing;

a noise-counteracting unit that is mounted on said carrier, that is electrically connected to said capsule unit with opposite electrical polarity, that is spaced apart from said capsule unit along the axis, that cooperates with said capsule unit and said carrier to define a first chamber in spatial communication with said at least one through hole, and that is configured to generate a secondary electrical signal attributed to the first mechanical wave and having an electrical polarity opposite to an electrical polarity of the primary electrical signal;

a damping unit that includes a shock-absorbing component connected to said housing and said carrier, and cooperating with said housing, said carrier, and said noise-counteracting unit to define a second chamber that is configured to generate a second mechanical wave attributed to vibration of air in said second chamber, the second mechanical wave propagating through said at least one through hole and said first chamber to said capsule unit, wherein said housing, said carrier, said capsule unit, said noise-counteracting unit and said shock-absorbing component cooperatively define an airtight space, and at least one damping component disposed on said carrier to cover said at least one through hole, and configured to change one of an amplitude and a phase of the second mechanical wave passing therethrough so as to make the second mechanical wave counteract the first mechanical wave when the second mechanical wave and the first mechanical wave are transmitted to said capsule unit; and a processing unit that is disposed in said housing, that is electrically connected to said capsule unit and said noise-counteracting unit, and that is configured to receive the primary electrical signal and the secondary electrical signal, and to make the secondary electrical signal counteract the secondary signal part of the primary electrical signal.

2. The microphone as claimed in claim 1, wherein said first chamber is divided into a first room that is adjacent to said capsule unit and that is in spatial communication with said at least one through hole, and a second room that is adjacent to said noise-counteracting unit and that is airtight.

3. The microphone as claimed in claim 2, wherein each of said first room and said second room has a volume smaller than 12 $cm^3$.

4. The microphone as claimed in claim 1, wherein said at least one through hole has a total area ranging from 0.79 $mm^2$ to 227 $mm^2$.

5. The microphone as claimed in claim 1, wherein said damping unit includes two of said shock-absorbing components that are connected between said housing and said carrier to suspend said carrier in said housing and that are spaced apart from each other along the axis, one of said shock-absorbing components cooperates with said housing, said carrier, and said noise-counteracting unit to define a second chamber, and another one of said shock-absorbing components is formed with a plurality of perforations that extend along the axis and that allow the second mechanical wave to travel therethrough.

6. The microphone as claimed in claim 5, wherein said damping unit further includes a rigid ring that is connected to said housing and that has a first ring portion and a second ring portion that are arranged along the axis, the first ring portion being closer to said capsule unit than said second ring portion, wherein each of said shock-absorbing components includes a connection portion, and a suspending portion that is opposite to said connection portion in a direction perpendicular to the axis and that fits over said carrier, wherein said connection portion of said one of said shock-absorbing components fits over said first ring portion, and said connection portion of said another one of said shock-absorbing components fits over said second ring portion.

7. The microphone as claimed in claim 1, wherein said capsule unit includes a first diaphragm configured to convert the acoustic wave and the first mechanical wave into a first vibration, and a first transducer connected to said first diaphragm and configured to convert the first vibration into the primary electrical signal.

8. The microphone as claimed in claim 7, wherein said noise-counteracting unit includes a second diaphragm configured to convert the first mechanical wave into a second vibration, and a second transducer connected to said second diaphragm and configured to convert the second vibration into the secondary electrical signal.

* * * * *